United States Patent [19]
Basile et al.

[11] Patent Number: 5,282,019
[45] Date of Patent: Jan. 25, 1994

[54] METHOD AND APPARATUS FOR THE TRANSMISSION AND RECEPTION OF A MULTICARRIER DIGITAL TELEVISION SIGNAL

[76] Inventors: Carlo Basile, 27 Underhill Rd., Ossining, N.Y. 10562; Aldo G. Cugnini, 177 White Plains Rd., Tarrytown, N.Y. 10591; Alan P. Cavallerano, 10-9 Nicole Cr., Ossining, N.Y. 10562; Yo-Sung Ho, 117 S. Highland Ave., #5A, Ossining, N.Y. 10562; David A. Bryan, 2 Wedgewood Dr., Danbury, Conn. 06811-2844; Faramarz Azadegan, 6 Tead Rd., Brookfield, Conn. 06804; Mikhail Tsinberg, 2743 Arlington Ave., Riverdale, N.Y. 10463

[21] Appl. No.: 875,491

[22] Filed: Apr. 29, 1992

Related U.S. Application Data

[63] Continuation of Ser. No. 647,383, Jan. 29, 1991, Pat. No. 5,134,464, which is a continuation-in-part of Ser. No. 614,885, Nov. 16, 1990, which is a continuation-in-part of Ser. No. 428,278, Oct. 25, 1989, Pat. No. 5,053,860, which is a continuation-in-part of Ser. No. 252,954, Oct. 3, 1988, Pat. No. 5,006,926.

[51] Int. Cl.$^5$ .................... H04N 11/12; H04N 7/06
[52] U.S. Cl. .................... 358/12; 358/141; 358/143
[58] Field of Search .................... 358/12, 141, 142, 133, 358/15; 370/118, 109; H04N 11/12, 7/06

[56] References Cited

U.S. PATENT DOCUMENTS

| | | | |
|---|---|---|---|
| 4,882,614 | 11/1989 | Kegeyama et al. | 358/141 |
| 4,945,411 | 7/1990 | Cavallerano et al. | 358/141 |
| 4,977,454 | 12/1990 | Tsinberg | 358/141 |
| 5,006,926 | 4/1991 | Tsinberg | 358/12 |
| 5,053,860 | 10/1991 | Tsinberg | 358/12 |
| 5,087,970 | 2/1992 | Cavallerano et al. | 358/12 X |
| 5,134,464 | 7/1992 | Basile et al. | 358/12 |

Primary Examiner—James J. Groody
Assistant Examiner—Mark R. Powell

[57] ABSTRACT

A method and apparatus for encoding a television source signal having a first bandwidth, into a frequency multiplexed signal having a narrower bandwidth and comprising a plurality of subcarriers modulated with digital information. Each of said subcarriers has an amplitude, bandwidth and coding characteristic which reflects the relative importance of the digital information provided thereby. The frequency multiplexed signal is suitable for use in a broadcasting environment wherein a conventional television signal is also used and wherein said subcarriers are disposed in frequency, in positions which are least likely to result in interference to or from said conventional signal. The invention also includes a receiver for decoding the frequency multiplexed signal and for providing a high definition display.

13 Claims, 5 Drawing Sheets

METHOD AND APPARATUS FOR THE TRANSMISSION AND RECEPTION OF A MULTICARRIER DIGITAL TELEVISION SIGNAL

This is a continuation of application Ser. No. 647,383, filed Jan. 29, 1991 now U.S. Pat. No. 5,134,464. This application is a continuation-in-part of copending U.S. application Ser. No. 614,885, filed on Nov. 16, 1990, which is itself a continuation-in-part of U.S. application Ser. No. 428,278, filed Oct. 25, 1991 now U.S. Pat. No. 5,053,860 a continuation-in-part of U.S. application Ser. No. 252,954, filed Oct. 3, 1988, now U.S. Pat. No. 5,006,926.

CROSS REFERENCE TO RELATED APPLICATIONS AND PATENTS

U.S. Pat. No. 4,694,338, issued Sep. 15, 1987;
U.S. Pat. No. 4,794,447, issued Dec. 27, 1988;
U.S. Pat. No. 4,908,697, issued Mar. 13, 1990;
U.S. patent application Ser. No. 246,490, filed Sep. 19, 1988;
U.S. patent application Ser. No. 252,954, filed Oct. 3, 1988;
U.S. patent application Ser. No. 271,136, filed Nov. 14, 1988;
U.S. patent application Ser. No. 353,353, filed May 17, 1989;
U.S. patent application Ser. No. 361,523, filed Jun. 2, 1989
U.S. patent application Ser. No. 428,278, filed Oct. 25, 1989; and
U.S. patent application Ser. No. 614,885, filed Nov. 16, 1990.

The above referenced patents and applications are all assigned to the same assignee, have common inventorship, and are specifically incorporated by reference herein.

BACKGROUND OF THE INVENTION

The so called "simulcast" methodology currently favored by the Federal Communications Commission, involves transmitting a conventional television signal, for example NTSC, over a first television channel, and transmitting a high definition television (HDTV) signal over an additional channel which would be assigned to each broadcaster. Since the assignment of an additional channel to each broadcaster will involve the use of those channels currently designated as "taboo" channels (i.e. those restricted for use in a given location), use of those channels requires that a way be found to prevent or minimize within acceptable limits, the interference caused by or to these additional broadcast signals with respect to the existing conventional signals.

The copending parent application Ser. No. 614,885 referred to above, describes an embodiment of a multicarrier television signal having a particular advantage in that it minimizes co-channel interference with conventional transmissions. The embodiment of the HDS/NA-6 signal described in the parent application features the placing of its multiple subcarriers within the frequency spectrum of its channel bandwidth, so as to avoid the high energy video and chroma subcarriers present in a conventional (i.e. NTSC) signal occupying the same channel in a nearby city, in other words a "taboo" channel. Although this embodiment featured an analog approach to the signal configuration, the application also discussed a digital embodiment of the invention. The instant application represents an embodiment of such a digital configuration.

It is therefore an object of the instant invention to provide a method and apparatus for implementing a digital television signal which will eliminate, or minimize to acceptable levels, interference to a conventional television signal present in a related television channel.

It is another object of the invention to provide a digital signal which is least affected by the conventional television signal.

It is yet another object of the invention to provide a method and apparatus for encoding a digital multicarrier signal in a manner which provides optimum protection against co-channel interference.

It is a still further object of the invention to provide a method and apparatus for decoding the digital signal and providing an HDTV display.

SUMMARY OF THE INVENTION

The instant invention comprises digital source coding, channel coding, and modulation techniques which allow for the transmission of an HDTV signal in a "simulcast" type advanced television system, for example one in which a 6 MHz "taboo" channel is used. The signal described herein is also robust for other transmission channels and for cable, and is not restricted exclusively to HDTV source inputs or 6 MHz bandlimited channels.

The coding and modulation techniques comprised by the invention, groups video data according to perceptual importance and then places the most important data in the part of the transmission channel which is least vulnerable to interference, and the least important data in the part of the channel which is most vulnerable to interference. Vulnerability can be defined in terms of interference from an NTSC signal provided on a co-channel (i.e. "taboo" channel). As in the analog approach detailed in the parent application, multiple carriers are strategically placed within the channel in the inventive signal as a function of the NTSC co-channel characteristic, in that the carriers feature a placement and energy distribution which attempts to avoid or minimize the potential interference.

The invention comprises source coding which can provide, for example, a data stream in the vicinity of about 20 Megabits per second (Mb/s). After appropriate multiplexing of digital audio, other digital data (i.e. control signals), and forward error correction and channel coding, the data rate presented to a modulator is nominally about 30 Mb/s. Such a data rate requires a modulation scheme which can deliver nominally 5 bits/sec/Hz in order to transmit this information in a 6 MHz channel.

Terrestrial broadcast channels and cable channels possess a high degree of linearity when compared with other channels such as satellite channels. A preferred type of modulation for the embodiment of the inventive signal described herein, is quadrature amplitude modulation (QAM). Although 64-QAM (64 levels of quantization) is used on all carriers in the embodiment described herein, other types of modulation can also be used.

The instant invention provides for different probabilities of error for different components in accordance with their relative importance. This can be accompanied with graceful degradation of the video signal as a function of distance and/or the increase the background impairments. As used herein, impairments mean random or impulse/burst noise, co-channel interference and multipath from conventional television signals.

The invention comprises an interframe coding scheme whereby key components are transmitted such that they can be received with the lowest probability of error and over the longest distance possible. This in turn, creates a notion of hierarchy in coding and transmission of the video signal. Different levels of hierarchy related to video reception and quality are transmitted using different carriers in the multi-carrier structure. In this case, the carrier that has the highest signal-to-noise ratio and the lowest probability of error, and therefore can reach the farthest distance, will carry at least the most important information. A similar mapping can be associated with lower levels in the hierarchy.

The multi-carrier embodiment of the invention described herein includes means to suitably shape the spectrum of the modulated signal in order to provide different levels of signal-to-noise ratios for different carriers. This provides the flexibility of conveying different types of information via different carriers to the decoder. By different types of information we mean different codewords or different bits. A few examples of relatively high priority information that could be transmitted with low probability of error are: motion vectors, the low-frequency coded video region (both luminance and chrominance), and intra-frame video coded information (the refresh information). On the other hand, information with a lower priority can consist of high-frequency components in the refresh frame and the motion-compensated frame-difference information for both luminance and chrominance. Note that synchronization codewords are assumed to have the highest level of importance and are therefore treated separately.

It is possible to reconstruct the video signal with some degradation using only the low frequency components and the motion vector components. Note also that motion vector components can play a more important role in reconstructing the video. For example, the video can still be reproduced with only the motion vectors and the correct reception of the intra-frame coded signal so long as the picture content or channel conditions are not drastically changed.

These and other objects, advantages, aspects and features of the instant invention will be more fully understood and appreciated upon consideration of the following detailed description of the preferred embodiments presented in conjunction with the accompanying drawings.

DETAILED DESCRIPTION OF PREFERRED EMBODIMENTS OF THE INVENTION

One way to achieve the co-channel transmission compatibility required in a "simulcast" environment as described above, is to analyze the spectral nature of the NTSC signal and configure the HDTV signal to be provided in the co-channel to be robust in terms of emission into the NTSC channel while simultaneously minimizing the the NTSC channel interference to the HDTV signal. This bidirectional analysis is used in the instant invention, in conjunction with a complete HDTV coding and modulation scheme.

Figure 1A:
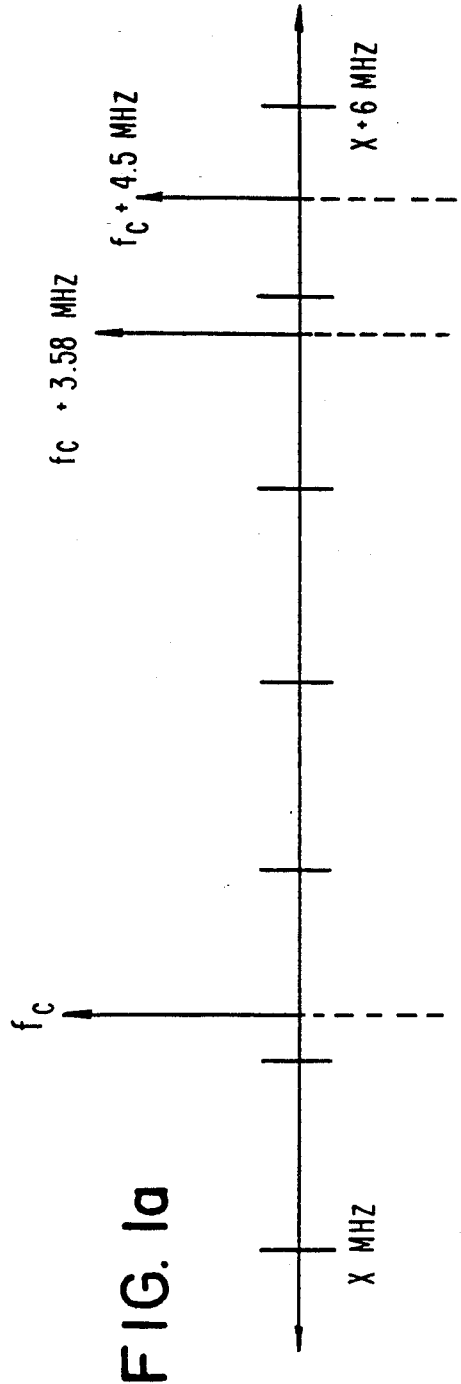
FIG. 1a describes the frequency spectrum of an NTSC signal.

FIG. 1a illustrates the make-up of an NTSC signal in its modulated state. The characteristic spectrum of the NTSC signal has significant energy at the VSB-AM picture carrier frequency fc, at the DSB-AM color subcarrier frequency fc+3.58 MHz, and at the FM aural carrier frequency fc+4.5 MHz. Statistically, for typical scene content, the spectral energy comprising an image decreases rapidly away from the carrier frequencies. As in the parent application, the embodiment of the invention described herein minimizes interference into the NTSC channel, and is more tolerant of interference caused by the NTSC transmission, by using a number of carriers placed in such a way as to substantially avoid creating spectra in the vicinity of these NTSC carriers. The interference caused by the inventive signal across the entire 6 MHz band must also be considered because the distribution of energy is typically non-uniform, and the way in which an NTSC receiver demodulates a signal is not the same for all frequencies within the 6 MHz channel. This is partially due to the channel properties and the Nyquist slope, video/audio, and luminance/chrominance filters in all NTSC receivers. Also, the human visual system's perceptibility of interference is varying with spatial and temporal frequencies and color.

Figure 1B:
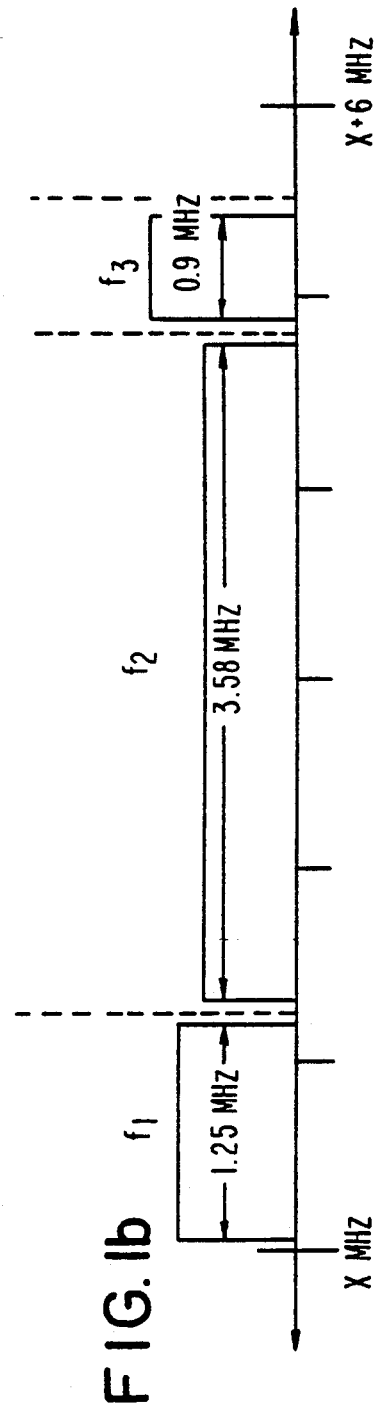
FIG. 1b describes the placement of subcarriers in accordance with the invention.

FIG. 1b illustrates a first embodiment of a digital signal comprising the invention. Three carriers, f1, f2 and f3 are used. As compared to the relative positions of corresponding NTSC carriers, carrier f1 is positioned relatively between the lower band edge and the NTSC picture carrier fc. A second carrier f2 is positioned relatively between the NTSC picture carrier fc and the chroma subcarrier fc+3.58 MHz, and third carrier f3 is positioned relatively between the NTSC chroma subcarrier, and the aural subcarrier fc+4.5 MHz. The f1 carrier is modulated so that the resulting bandwidth is less than about 1.25 MHz. The f2 carrier is modulated to have a bandwidth of less than about 3.58 MHz, and the f3 carrier is modulated to have a bandwidth of less than about 900 kHz. Although three carriers are used in this embodiment, a greater or lesser number of carriers could be employed. Alternate carrier positions are also possible.

In accordance with the invention, each of the carriers f1, f2 and f3, is modulated with data which would create spectra of different bandwidths on each carrier however these bandwidths are chosen to avoid significant energy in the vicinity of the corresponding NTSC carriers, thus minimizing interference into and from the NTSC channel.

Although designed to overcome the problems inherent in a "simulcast" broadcasting environment, the invention is also suitable for other transmission and/or recording paths where there are no similar interference problems. In such a scenario however, the carrier "packaging" could be reconfigured to better match the particular delivery environment.

Depending on which part of the channel is more vulnerable and what trade-offs exit with respect to NTSC interference performance, the power levels of each carrier need not be the same. Also since the carriers are modulated for different discrete bandwidths, the sum of which is 6 MHz, the signaling rates will be different and therefore the error rates could be different. These differences can all be exploited so that the largest error rates occur on perceptually insignificant data and the smallest error rates occur with perceptually significant data.

Figure 2:
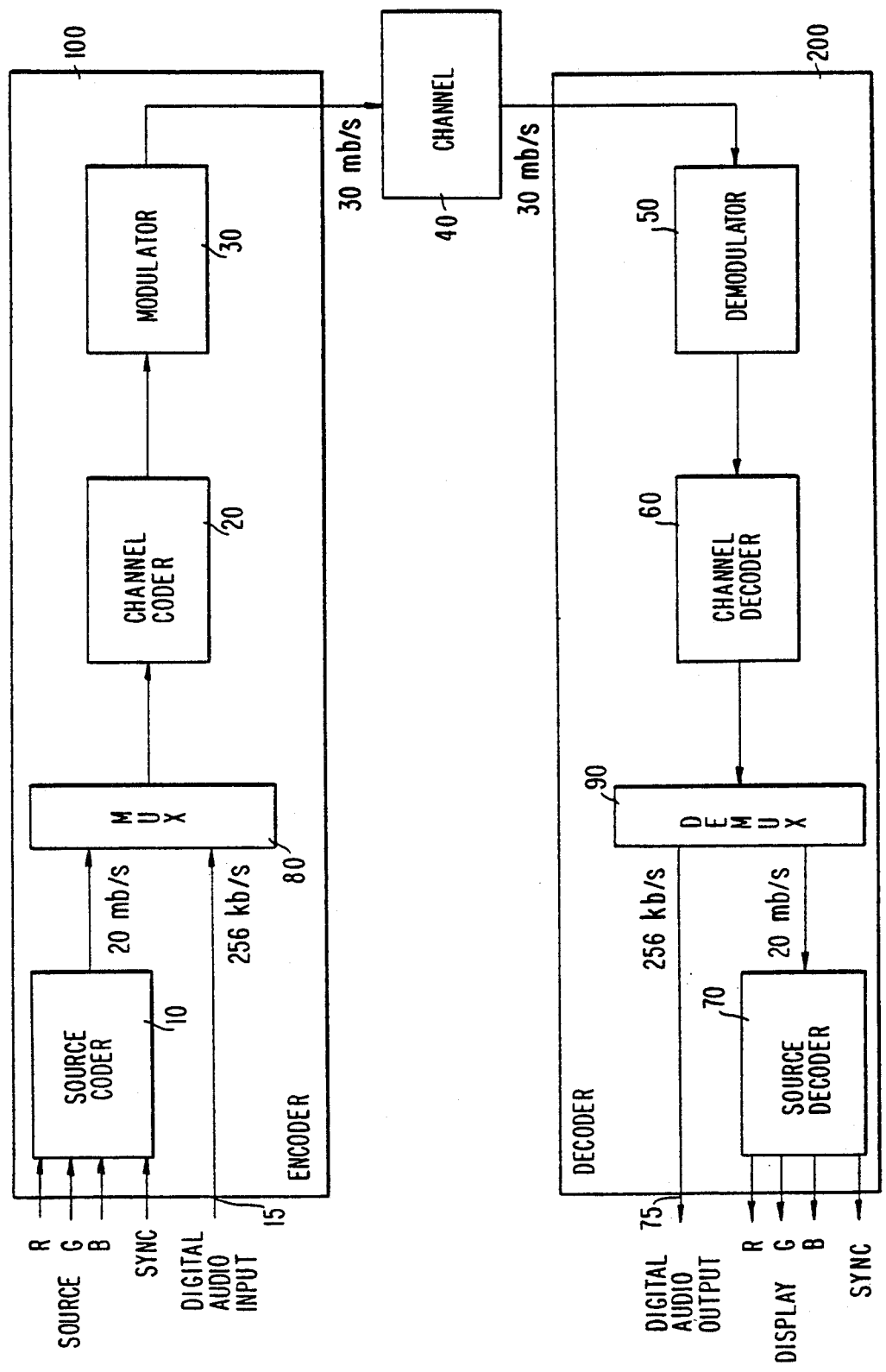
FIG. 2 describes, in block diagram form, a basic system for practicing the invention.

One embodiment of a system comprising an encoder 100 and, which can for example, be part of a transmitter or the record circuit of a storage device, and decoder 200 which can for example, be part of a receiver or playback circuit of the storage device, incorporating the invention is shown in FIG. 2.

A source coder 10 is provided with video signals, for example RGB signals derived from a high definition source signal together with appropriate sync signals. The resulting source encoded data stream has a bit rate which is nominally about 20 Mb/s. A digital audio data signal is provided at input 15 at a bit rate of nominally about 256 kb/s. The source encoded data stream and the audio data are multiplexed in multiplexer 80 and the multiplexed data is then provided to channel coder 20 which performs channel coding for error protection. The data stream provided by channel coder 20 is then modulated onto multiple carriers in modulator 30 forming a digital television signal, having a constant bit rate of nominally about 30 Mb/s, which is carried by a data path or channel 40 which can be a 6 MHz conventional television channel, for example.

The decoder block 200 provides processing functions to decode the data stream provided by the channel 40. The 30 Mb/s data stream is demodulated in demodulator 50 and channel decoded in channel decoder 60 to detect and correct errors. The data stream from channel decoder 60 is demultiplexed in demultiplexer 90 to form the digital audio stream and the video/sync data stream, the audio stream being provided at output 75. The video/sync data stream is decoded in source decoder 70 to form video and sync signals which are used to provide a video display.

The source video can be RGB of HDTV quality, such as wideband, wide-aspect ratio, 1050/2:1 video, and high-quality digital audio. Synchronization signals, which indicate the vertical and horizontal blanking intervals are also required to lock the source coder 10 to the incoming video frame, and process only active parts of the active lines starting with the first pixel in each line. Source coder 10, can be a subband coder with Vector Quantization (VQ) processing and/or Discrete Cosine Transform (DCT) processing, for example. It can use intra-frame processing and can also incorporate motion prediction and coding of motion-vector assisted frame-difference processing and frame skipping. The source coder 10 can also provide coded video in the form of a bit stream where all bits are not of equal value. For example, bits corresponding to motion vectors would be given greater value because they must be received by the decoder accurately or else the reconstructed image provided by the decoder will be unacceptable.

Digital audio encoding at nominally 128 Kb/s per left and right stereo channels is a known process with quality comparable to CD (as defined by a MUSICAM system or a Dolby system). Additional data, such as additional stereo or mono audio channels, or lower-quality data channels, can be inserted into the data stream at the multiplexer 80.

The channel coder 20 allows for forward error protection of the bit stream, and when the overhead of error protection, synchronization, and other housekeeping bits is included, the data rate out of the encoder 100 is nominally 30 Mb/s. Although in the embodiment described herein, modulator 30 is a 64 Quadrature Amplitude Modulator (QAM), other modulation methods, such as quadrature partial response (QPR) can also be used. The combined channel coder and modulator can create a stream of bits of varying priority with spectrum shapes to provide interference protection from and to an NTSC co-channel.

The channel 40 represents the path or medium having a given bandwidth, which is used to carry the signal encoded by encoder 100 to decoder 200. This channel is, in the example shown, a conventional (i.e. 6 MHz NTSC) terrestrial or cable channel. The properties and characteristics inherent in the channel are not predictable because of varying transmission environments. The channel properties will tend to alter the encoded signal in some way, perhaps resulting in bit errors at the decoder 200. The channel encoding and positioning of carriers at the encoder 100 will tend to protect the bit stream from gross anomalies.

The output of the source encoder 10 consists of a string of bits associated with codewords which represent the coded (i.e. compressed) signal. The data provided by the output of source encoder 10 can have different coding characteristics, for example some codewords might convey more important information about the compressed data than others, and/or the bits in each codeword might have different significance. As a result, in the presence of channel errors, the important codewords and bits warrant more protection than the less significant codewords or bits. This can be achieved by using optimized different forward error correction techniques (multi-FEC) and/or multi-tier modulation techniques which are known to those skilled in the art, referred to herein as unequal error protection.

As discussed above, when the encoded digital television signal is to be transmitted or provided over a channel which represents a "taboo" co-channel to an NTSC channel, in order to minimize co-channel interference it is necessary to shape the spectrum of the digital signal within its channel. The spectrum shaping is done in order to reduce the effect of the NTSC signal on the encoded signal and vice-versa. In accordance with the invention, the digitally encoded signal should carry the least amount of information in the frequency regions where the NTSC co-channel signal contains a high amount of power—namely in the frequency regions where the picture, color sub-carrier and sound carriers reside. As described in the parent and grandparent applications incorporated by reference herein, the use of multiple carriers optimally placed with respect to the NTSC carriers is an effective way to achieve this goal.

In the digital embodiment of the invention discussed herein, the multi-carrier approach is coupled with the use of a multi-FEC system which provides different levels of protection for codewords or bits against channel noise. This would mean the error probability for some codewords or bits will be lower than others. In addition, an appropriate combination of different FEC techniques, for various categories of codewords with equal importance, will guard against different types of noise such as random noise or burst/impulse noise.

In an NTSC signal, the power of each carrier is not uniform over the entire channel spectrum. In accordance with the invention, the power of the modulated signal similarly is not uniform over its entire spectrum and, as shown in FIG. 1b, different carriers can have different bandwidths and/or amplitudes (power levels). The power level associated with each carrier can be tailored according to the corresponding power level present in corresponding portions of the NTSC signal. Furthermore, the power associated with each carrier in the modulated signal can be time varying. The system therefore, has the added flexibility of increasing the signal-to-noise ratio for specific time intervals such as the NTSC co-channel vertical blanking interval (VBI). FEC techniques associated with respective carriers can differ in performance in terms of reducing the probability of error. In addition to changing the power levels for carriers, different modulation techniques can be used for different carriers.

The amount of data associated with visual information is so large that transmission of image data requires a very wide bandwidth. For example, if a digital HDTV system has as a source signal a video signal with a spatial resolution of 1050 interlaced TV lines with an aspect ratio of 16:9, a field rate of 59.94 fields per second, and 8 bits per pixel in each component RGB, the required transmission rate of the raw data is nearly one gigabit/s. In order to transmit such a large amount of information through a conventional terrestrial channel of 6 MHz for example, source coding with a large compression ratio is absolutely required. The input HDTV source signal can comprise interlaced fields which are combined to form frames and then split into separate components having different categories of perceptual importance. One way to make frames is to take 480 active lines from the first (i.e. odd) 59.94 Hz field and delaying and combining them with the 480 active lines of the next (i.e. even), interlaced field, thus creating a 29.97 Hz, 960 line frame. There are other ways to create frames and temporal prefiltering may be employed. The frame signal can be divided into various spatial frequencies, such as low-frequency luminance, high-frequency luminance, and chrominance signals, each of which affects human visual perception differently. After the frame signal is split, an appropriate coding technique is employed to compress the information in each of a number of bands. Based on the signal characteristics of each band, any of predictive, transform, or vector coding techniques can be implemented to exploit the correlation among neighboring pixels.

Figure 3:
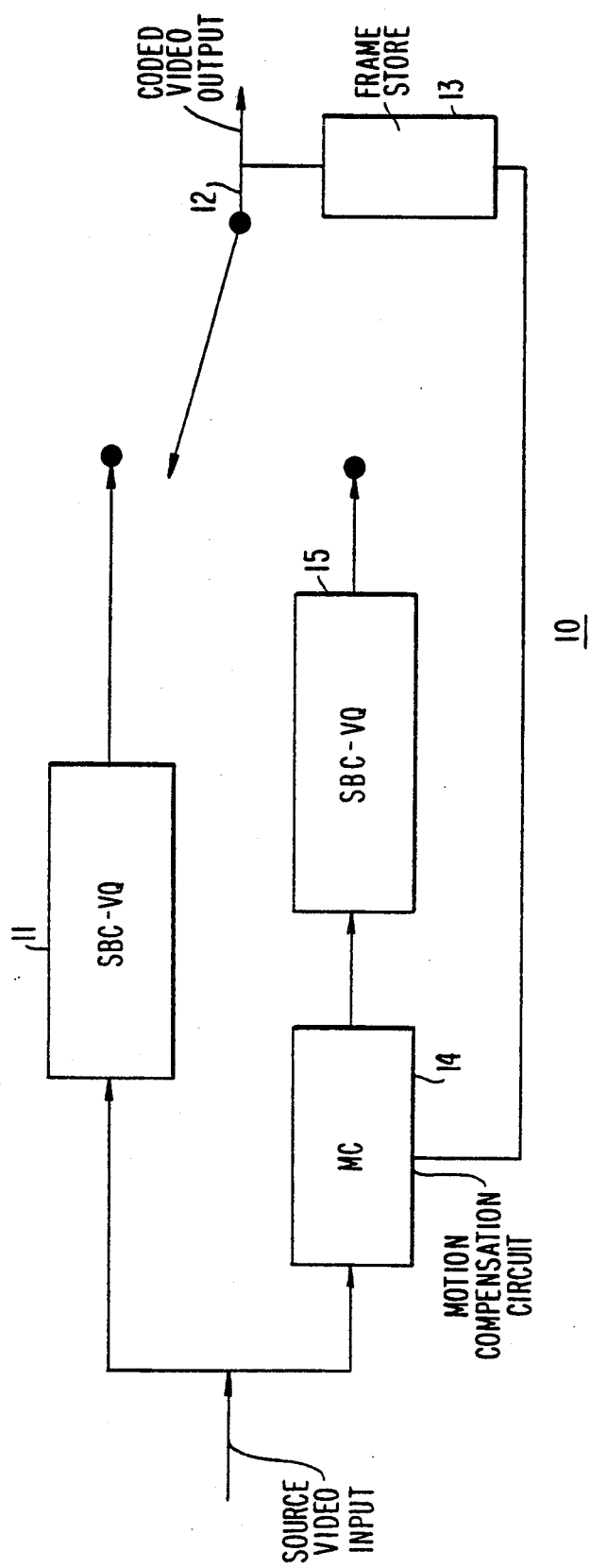
FIG. 3 describes one embodiment of a source coder.

FIG. 3 describes an embodiment of a source encoder 10 which utilizes an intra/inter frame SBC-VQ (subband coding, vector quantization) coding method. In accordance with this method, the first frame of an input image sequence of, for example, eight frames, is encoded with an intra-frame coding scheme which exploits only the spatial-domain correlation among neighboring pixels.

The source coder 10 can incorporate an intra-frame coding scheme based on subband splitting such as taught in R. E. Crochiere, S. A. Webber, and J. L. Flanagan, "Digital Coding of Speech in Subbands," Bell. Syst. Tech. J., vol. 55, pp. 1069-1085, Oct. 1976, and vector coding such as taught in R. M. Gray, "Vector Quantization," IEEE ASSP Magazine, vol. 1, No. 2, pp. 4-29, April 1984. These references are incorporated by reference herein.

In order to remove any impairments to the channel noise, source coder 10 processes a sequence of eight frames in the following manner. Each quarter of a second, sixteen fields of 480 active lines each are converted as eight frames of 960 active lines at 29.94 Hz. The first of each sequence of eight frames is subjected to a higher bit rate intra-frame coding process using SBC-VQ coding module 11. The coded first frame is provided at coded video output 12 and stored in frame store 13 as well. Each of the remaining seven frames in the sequence are subjected to both residual coding and motion vector estimation in motion compensation circuit 14. In this motion compensation circuit, the temporal main correlation and consecutive image frames as well as the spatial domain correlation among neighboring pixels is exploited. This sufficiently reduces the temporal domain redundancy in image sequences by estimating the motion of image pixels or constituent components between successive frames. A typical method for motion estimation is based on a block matching algorithm as taught in H. G. Musmann, P. Pirsch, and H. J. Grallert, "Advances in Picture Coding", proceedings IEEE, April 1985, incorporated by reference herein. Once motion estimation is complete, the predicted pixel values with motion compensation are subtracted from the original pixel values to obtain residual errors.

An error frame is then created and coded in a second SBC-VQ encoder 15. The outputs of either SBC-VQ encoder 11 or 15 are chosen to provide a 1 in 8 "refresh" cycle.

SBC-VQ coder 15 uses similar coding techniques as coder 11 however, since residual errors have different characteristics from the original signals, the coding scheme is modified according to the signal statistics of the residual errors. The source coder 10 can also utilize known processes such as frame skipping and interpolation to further reduce the amount of data actually transmitted.

In order to remove any impairments due to channel noise, the intra-frame coder is used at a certain time interval. For example, an image frame is refreshed about four times per second. More than one bit per pixel (bpp) should be allocated for intra-frame coding to reproduce high quality pictures. If the source encoder has to produce a bit stream at a rate of 20 Mb/s, the budget for bit assignment to each component of inter-frame coding is only about 0.3 bpp, which is not enough to reproduce good motion rendition. In order to assign more bits to inter-frame coding, frame skipping is included as a preprocessing operation and frame interpolation with motion compensation is included as a post-processing operation. If sixteen 59.94 Hz fields are processed, for example, this nominally requires ¼ second. This quarter-second period is crucial, because if processing spreads beyond nominally one quarter second and there are bit errors or coding noise, then it is generally believed that the system as a whole is inadequate and also has implications for changing channels, special effects on VCR, etc.

If frame skipping is used, the first frame is intra-frame coded as described above however frames 2, 4, 6 and 8 are skipped and frames corresponding to these frames are derived through interpolation. Frames 3, 5 and 7 are coded and reconstructed utilizing the motion vector estimation and residual coding as described above.

A luminance signal Y derived from the HDTV source signal for example, can be divided into several frequency bands of quite different signal characteristics. In order to make use of such variations, a suitable coding algorithm for each band is employed with careful examination of band statistics. Based on the statistics of split bands and their perceptual importance to the human observer, we allocate different numbers of bits among the subbands. When vector quantization (VQ) is employed, each band is coded using a codebook that is specifically designed for that band. To obtain improved picture quality at moderate bit rates while avoiding a potential complexity problem of VQ in certain subbands, multi-stage or predictive VQ schemes can be incorporated into the above system. Since the chrominance signals, U and V, are generally band-limited, they are first subsampled with 2:1 ratio in both vertical and horizontal directions before they are similarly encoded as the luminance component Y.

Figure 4:
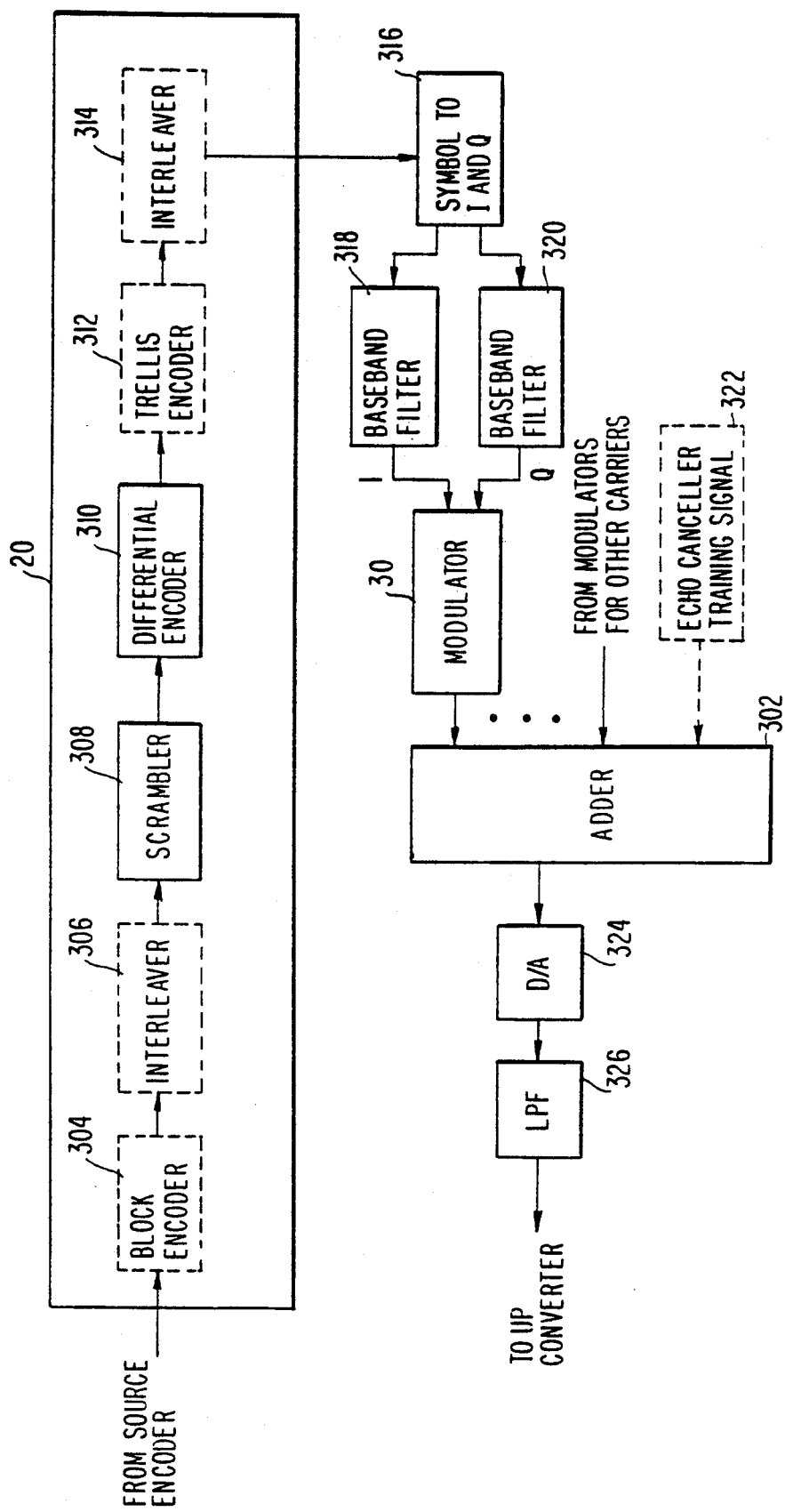
FIG. 4 describes one embodiment of a transmitter in accordance with the invention.

FIG. 4 describes in more detail, an embodiment for a transmitter in accordance with the invention, comprising a channel coder 20 and modulator 30. Source coder 10 will produce a plurality of data streams, each related to a coding priority level. For each of the data streams, a channel coder/modulator combination is needed to form a respective subcarrier.

FIG. 4 describes the transmitter functionality for one of the n bit streams output by the source encoder 10. Similar functionality is assumed for the processing of the other n−1 source coder output streams. The outputs of the modulators for the various output streams are combined in adder 302 forming a frequency multiplexed signal. Not shown is the up converter needed to translate the output of adder 302 to an RF frequency in the appropriate VHF/UHF television band.

The frequency spectrum of the signal output of adder 302 occupies a band of frequencies above DC, i.e., it does not begin at baseband. This is because the modem receiver and upconverter functions are in some cases more easily performed in the passband. A typical placement of the combined spectrum of the frequency multiplexed signal is for example, 2-8 MHz.

Processing in channel coder 20 of a data stream from source encoder 10, begins with the optional block encoder 304. Its function is to add parity bits to a block of source coder bits. These parity bits will allow some errors to be corrected at the receiver. The functionality of interleaver 306 varies according to whether or not a trellis decoder is used in the receiver. It is known that use of Viterbi decoding in the receiver's trellis decoder will lead to short bursts of errors under impaired reception conditions. Use of the block encoder 304 and the following interleaver 306 will allow these errors to be corrected. Interleaver 306 functions to spread out the bits in time, enhancing the performance of the block decoder in the receiver. This spreading means that burst errors generated by the receiver's Viterbi (trellis) decoder (if used) appear as random errors to the receiver's block decoder, allowing it to be less complex than would be required if it had to correct errors appearing in bursts. However, it might not be necessary to use interleaver 306 at all if the receiver's block decoder and/or source decoder can adequately deal with short (and perhaps infrequent) bursts of errors.

If a trellis decoder is not used in the receiver, then the functionality of interleaver 306 (if used) is to spread out the transmitted symbols such that disturbances on the channel due to impulse noise do not affect closely sequential symbols emitted by the modem transmitter.

The scrambler 308 consists of circuitry to break up any periodic patterns in the bit stream. Its output is a pseudorandom bit stream. This serves several functions: dispersal of the transmitter signal energy across the channel band to minimize interference with co-channel NTSC and/or adjacent channel NTSC or digital signals; creating a large average transition density in the bit stream to enhance timing recovery in the modem receiver, and dispersal of energy to allow the receiver's adaptive equalizer (if used) to correctly compensate for distortions introduced by the channel and/or the filters in the modem transmitter and receiver.

The differential encoder 310 is needed to allow the receiver to correctly decode the data regardless of a rotation of the constellation by a multiple of 90 degrees. In the receiver, there is an inherent quadrant ambiguity in the received constellation, i.e., the constellation "looks" the same to the carrier recovery circuitry when rotated by any multiple of 90 degrees. The differential encoder 310 encodes two bits of the transmitted symbol as phase differences rather than as absolute phase. These two encoded bits then specify the quadrant, and it is possible for the decoder to decode correctly regardless of a rotated constellation.

The optional trellis encoder 312 is included if a reduction in Bit Error Rate (BER) is needed over what is obtainable with uncoded modulation. Its usual structure forms symbols of some uncoded bits and some bits generated by a convolutional encoder. Generally, one extra bit per symbol is added by the convolutional encoder, thereby doubling the size of the constellation (with respect to uncoded modulation). Nonetheless, the BER can be reduced at the decoder if a sequence of trellis-coded symbols is processed as a sequence, assuming that the mapping of trellis coder output symbols to constellation points has been performed in the proper manner. The processor generally used to achieve this reduction in BER by the trellis decoder at the receiver is a Viterbi decoder.

An optional second interleaver 314 appears after the trellis encoder 312. It is known that impulse noise can be a serious impairment on TV channels, and this manifests itself as burst errors on the channel. The receiver's trellis decoder functions best on random errors. Thus, it may be necessary to impose an interleaver to spread out the symbols in time so that symbol errors appear randomly at the receiver. This second interleaver 314 would be used only if a trellis decoder is used at the receiver. If no trellis decoder is used at the receiver, then the function of interleaving to spread out channel errors would be performed by the interleaver 306 as described above.

The trellis-encoded symbols are then further divided into inphase (I) and quadrature (Q) components by the symbol to I and Q circuit 316. I and Q are then separately filtered by two baseband filters 318 and 320. For the QAM spectra discussed in the previous sections, these filters correspond to a raised cosine or square-root raised cosine shape in the frequency domain. For QPR spectra, the filters have a cosine or square root cosine shape.

The modulator 30 raises the baseband digital spectrum to the appropriate passband spectrum as specified in previous sections, for example, the frequencies "below" the NTSC picture carrier or the frequencies between the NTSC picture carrier and the NTSC sound carrier in the case of two carriers.

The adder 302 digitally combines the outputs of the various modulators whose signals make up the different parts of the composite frequency spectrum of the digital simulcast signal.

The VHF/UHF channel may suffer from multipath distortion. This distortion may be eliminated (or greatly reduced) by an echo canceller at the receiver. It may be possible to adaptively configure the receiver's echo canceller using only the composite pseudorandom data from the transmitter, but if not then it will be necessary to add the echo canceller training signal 322 as shown in the FIG. 4.

The composite digital signal is then converted to a continuous time signal by a Digital-to Analog (D/A) converter 324 and Low Pass Filter (LPF) 326 before being up-converted to the appropriate VHF/UHF frequency band.

Figure 5:
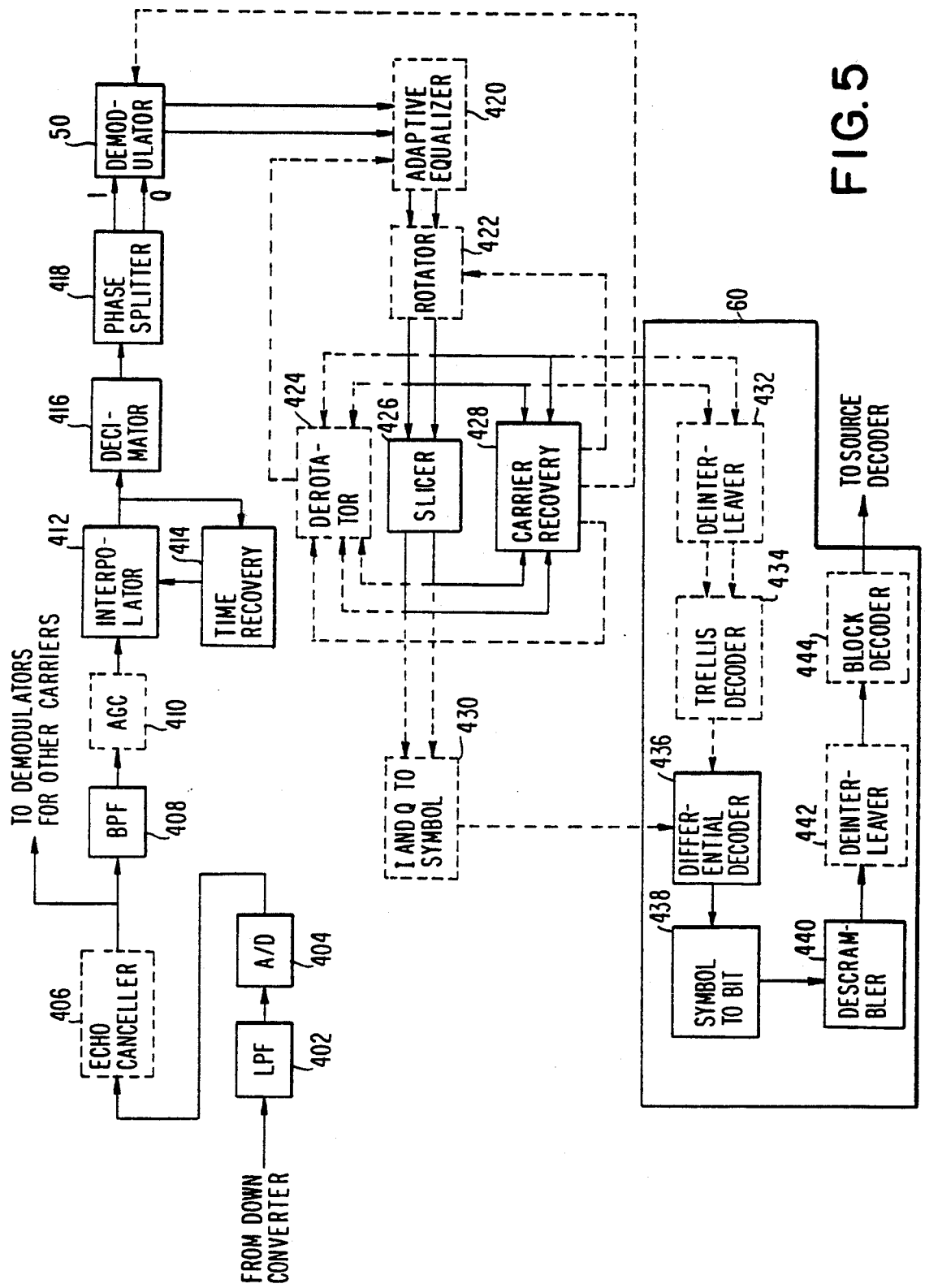
FIG. 5 describes one embodiment of a receiver in accordance with the invention.

FIG. 5 describes in greater detail an embodiment for a receiver in accordance with the invention, comprising a demodulator 50 and a channel decoder 60. For each of the demodulated subcarriers, a circuit comprising blocks 408 to 444 is needed to process the respective data streams.

After conversion from VHF/UHF frequencies down to the low frequency passband (e.g. 2-8 MHz) in a down converter (not shown), the digital signal is low-pass filtered in LPF 402 to avoid aliasing and applied to an analog-to-digital (A/D) converter 404, operating at several times the symbol rate. It is then processed by the optional echo canceller 406 which removes or minimizes the effects of multipath distortion introduced by the channel. At this point, the A/D output is routed to demodulators for other carriers within the digital signal spectrum.

The sampled signal is then digitally bandpass filtered in BPF 408 to extract the particular carrier of interest to each demodulator. Automatic gain control (AGC) 410 is performed on the signal to ensure that its amplitude is within a suitable range for good operation of the subsequent functions, particularly the adaptive equalizer and timing recovery circuits. An interpolator 412 controlled by the timing recovery circuit 414 is used to achieve symbol synchronization at the receiver. The interpolator 412 operates at a rate which is a (small) multiple of the symbol rate. The timing recovery circuit 414 controls the interpolator 412 in the fashion of a phase locked loop (PLL). The decimator circuit 416 then samples the interpolator circuit 412 output at the symbol rate.

The phase splitter 418 converts the received real valued signal to a complex signal. The shaping of the pulse to a raised cosine (for QAM systems) or cosine (for QPR systems) is completed at the I and Q outputs of the phase splitter 418. (The earlier BPF may have also contributed to this shaping).

The signal is then demodulated to baseband and optionally applied to a complex adaptive equalizer 420. This equalizer might not be needed if the echo canceller 406 is used, and if it does a good enough job equalizing the channel. It is also possible to do echo cancellation with the adaptive equalizer, if it has a large number of taps. However, it is probably more economical to use a single echo canceller 406, at the point shown in the FIGURE, for all demodulators. In either case the function of the adaptive equalizer 420 is to correct for any amplitude and phase distortion introduced by the channel and/or the filters in the transmitter and receiver. The result should be nearly perfect raised cosine or cosine-shaped data pulses at the output of the equalizer 420.

The function of the carrier recovery circuit 428 measures the phase error between the received data and a local reference carrier. This error can be used directly, in the case where no adaptive equalizer 420 is used, to control the phase of the local carrier used in the demodulator 50. If an adaptive equalizer 420 is used, the signal can instead be demodulated with an arbitrary (free-running) local carrier phase. Then the phase error generated by the carrier recovery circuit 428 is used to control the phase of the rotator 422. The rotator's function is equivalent to that of a demodulator that simply removes the phase error but does not shift the signal in frequency. If the adaptive equalizer and rotator are used, then the phase error is also sent to the derotator 424 and thence to the tap update processing of the adaptive equalizer 420. The derotator 424 essentially restores the phase error at the adaptive equalizer 420 so that data processing and tap update processing operates with the same phase offset.

The function of the slicer 426 is to convert the smooth raised cosine or cosine-shaped pulses at the output of the adaptive equalizer 420 to rectangular pulses representing multivalued digital version of the I and Q data. If a trellis decoder 434 is not used, the slicer's output is passed to the I and Q to symbol circuit 430, where it is decoded into multibit symbols representing the receiver's best estimate of the transmitted symbols. The phase error output of the carrier recovery circuit 428 is generated by calculating the difference between the phases of the slicer 426 output and its input.

If a trellis decoder 434 is used, it functions best with random errors at its input. The interleaver function of the encoder is used to spread out the transmitted symbols in time. Thus burst errors due to the channel may appear at the input to the deinterleaver 432, but the deinterleaver 432 will spread these errors out in time in the process of reconstructing the symbol sequence that existed before the interleaver in the transmitter.

The trellis decoder 434 employs Viterbi's algorithm to estimate the most likely transmitted sequence. It functions best with multibit resolution inputs and thus its input is taken before the slicer 426.

The differential decoder 436 implements the inverse process to the transmitter's differential encoder, using the difference between two bits of successive symbols to recover the transmitted data independent of an offset of a multiple of 90 degrees in the phase derived by the carrier recovery circuits.

The function of the symbol to bit circuit 438 is self explanatory.

The descrambler 440 implements the inverse function to the transmitter's scrambler, restoring the received bit stream from a pseudorandom stream to the receiver's best estimate of the bit stream before the scrambler in the transmitter.

The functionality of the deinterleaver 442 following the descrambler 440 differs according to whether or not a trellis encoder and decoder are used. If so, than this deinterleaver 442 functions to randomize burst errors due to the Viterbi decoder used in the trellis decoder 434, except that if it is found that such burst errors are not overly serious, no deinterleaver at all may be used at this point. If trellis encoding is not used, then deinterleaver 442 serves to randomize burst errors due to the channel.

An optional block decoder 444 uses the parity bits appended to the source coder output by the block encoder to correct any residual errors, if a block encoder was used.

The channel decoder 60 performs the necessary error correction, and provides in time-multiplex format to the demultiplexer 90, the nominally 20 Mb/s raw source encoded video data and the 256 Kb/s digital audio data. The demultiplexer 90 feeds the digital audio data to a digital audio decoder (not shown), such as a MUSICAM or Dolby decoder. Nominally 256 Kb/s are required for a CD-quality stereo pair, and additional data capacity can be provided within the transmitted data stream, as previously indicated.

The source decoder 70 takes the 20 Mb/s data stream that has been error corrected by the channel decoder 60, where some of the bits have higher and lower priority, and converts the bit stream to RGB. The source decoder 70 essentially performs the "inverse" algorithm to the process imposed at the source coder 10. For example, the source decoder 70 may perform the inverse DCT and VQ, for both intra- and inter-field processing. Motion vectors, which would be more heavily protected (that is, higher priority in the transmission channel), could be used to decode the inter-fields, and can also be used to assist the frame interpolation for any skipped frames.

In the embodiments of the invention described herein, those circuit blocks which are not explained in detail are well known to those skilled in the art and can be utilized in accordance with the disclosure provided herein, by those skilled in the art, to practice the invention without undue experimentation.

The foregoing disclosure and description of the invention is illustrative and explanatory thereof and various changes in the details of the illustrated embodiments may be made within the scope of the appended claims without departing from the spirit of the invention.

We claim:

1. A method for forming a frequency multiplexed television signal comprising the steps of:
   a) coding a television source signal having a first bandwidth into a plurality of digital data streams;
   b) processing each of said digital data streams so as to distribute information provided by each of them as a plurality of modulated subcarriers each having respective bandwidth, amplitude and coding characteristics, said subcarriers forming a frequency multiplexed signal having a second bandwidth which is more narrow than said first bandwidth; and
   wherein a first subcarrier is modulated with information having a first priority and a second subcarrier is modulated with information having a second priority.

2. The method as claimed in claim 1, wherein said modulated subcarriers are formed by quadrature amplitude modulation.

3. The method as claimed in claim 1, wherein each of said modulated subcarriers distributes its respective information at respective signaling rates.

4. The method of claim 1, wherein said information provided by each of said digital data streams determines which of said modulated subcarriers distributes said respective information.

5. The method of claim 1, wherein said second priority is higher than said first priority.

6. An apparatus for forming a frequency multiplexed television signal comprising:
   a) means for coding a television source signal having a first bandwidth, into a plurality of digital data streams; and
   b) means coupled to said source coding means for processing each of said digital data streams so as to distribute information provided by each of them as a plurality of modulated subcarriers each having respective bandwidth, amplitude and coding characteristics, said subcarriers forming a frequency multiplexed signal having a bandwidth which is more narrow than said first bandwidth; and
   wherein a first subcarrier is modulated with information having a first priority and a second subcarrier is modulated with information having a second priority.

7. The apparatus of claim 6, wherein said information provided by each of said digital data streams determines which of said modulated subcarriers distributes said respective information.

8. A receiver for providing a high definition television (HDTV) display, for use in a television transmission system wherein a television source signal having a first bandwidth, is encoded into a plurality of digital data streams and wherein each of said data streams is process so that information provided by each of them is distributed as a plurality of modulated subcarriers each having respective bandwidth, amplitude and coding characteristics, and wherein said modulated subcarriers form a frequency multiplexed television signal having a bandwidth which is more narrow than said first bandwidth, and wherein a first subcarrier is modulated with information having a first priority and a second subcarrier is modulated with information having a second priority, said receiver comprising:
   a) means for demodulating said frequency multiplexed signal so as to recover said modulated subcarriers; and
   b) means for decoding from said modulated subcarriers, a plurality of television signal components and for providing said components for display.

9. An apparatus for forming a frequency multiplexed television signal suitable for use in a broadcasting environment wherein a conventional television signal comprising a plurality of conventional subcarriers having respective frequency locations within said conventional television signal is also used, said apparatus comprising:
   a) means for coding a television source signal having a first bandwidth, into a plurality of digital data streams;
   b) means coupled to said source coding means, for processing each of said digital data streams so as to distribute information provided by each of them, as a plurality of modulated subcarriers each having respective bandwidth, amplitude and coding characteristics, said information provided by each of said digital data streams determining which of said modulated subcarriers distributes said respective information; and
   c) means for selecting the frequencies of said modulated subcarriers so as to place them in respective frequency locations within said frequency multiplexed signal so as to be least likely to cause interference to and suffer interference from at least one of said plurality of conventional subcarriers of said conventional television signal.

10. An apparatus for providing a television display from the frequency multiplexed television signal of claim 9, comprising:
   a) means for demodulating said frequency multiplexed signal so as to recover said modulated subcarriers; and b) means for decoding from said modulated subcarriers, a plurality of television signal components and for providing said components for display.

11. The apparatus of claim 9, wherein said plurality of conventional subcarriers comprises a picture subcarrier.

12. The apparatus of claim 9, wherein said plurality of conventional subcarriers comprises a color subcarrier.

13. The apparatus of claim 9, wherein said plurality of conventional subcarriers comprises a sound subcarrier.

* * * * *